(12) United States Patent
Ho et al.

(10) Patent No.: US 7,252,383 B2
(45) Date of Patent: Aug. 7, 2007

(54) WIRELESS AUDIO OUTPUT ASSEMBLY FOR PROJECTORS

(75) Inventors: Francis Ho, Taipei (TW); Henry Chien, Taipei (TW); Yu-Chin Li, Taipei (TW); Wen-Hung Hsu, Taipei (TW); Chung-Hua Tsai, Taipei (TW); Minglu Chen, Taipei (TW)

(73) Assignee: Meiloon Industrial Co., Ltd., Taipei (TW)

( * ) Notice: Subject to any disclaimer, the term of this patent is extended or adjusted under 35 U.S.C. 154(b) by 282 days.

(21) Appl. No.: 11/014,826

(22) Filed: Dec. 20, 2004

(65) Prior Publication Data

US 2006/0132715 A1 Jun. 22, 2006

(51) Int. Cl.
G03B 31/00 (2006.01)
G03B 21/14 (2006.01)
G03B 21/22 (2006.01)
G03B 21/26 (2006.01)
H04N 5/64 (2006.01)

(52) U.S. Cl. ............................ 353/15; 353/30; 353/119; 353/122; 348/838

(58) Field of Classification Search .................. 353/13, 353/15, 72, 119, 122, 19, 30; 348/838; 352/1; 360/1, 80; 369/70
See application file for complete search history.

(56) References Cited

U.S. PATENT DOCUMENTS 6,959,991 B2* 11/2005 Ho et al. ..................... 353/119
6,966,651 B2* 11/2005 Johnson ........................ 353/15

* cited by examiner

*Primary Examiner*—Melissa Jan Koval
(74) *Attorney, Agent, or Firm*—Troxell Law Offices, PLLC

(57) ABSTRACT

The present invention discloses an improved wireless audio output assembly for projectors, which comprises a system unit having a projector circuit therein and a projector lens disposed on the exterior of the system unit, and the system unit has a card-type wireless audio output circuit installed therein and a wireless active speaker installed on the exterior of the system unit, so that a projector can be used as a standalone device without connecting to external cables to read data from a memory card, view video images, and read audio/video signals of an optical disk. The projector can be upgraded to the user's desired wireless audio output circuit by inserting various different cards for the expansion.

8 Claims, 6 Drawing Sheets

WIRELESS AUDIO OUTPUT ASSEMBLY FOR PROJECTORS

BACKGROUND OF THE INVENTION

1. Field of the Invention

The present invention relates to an improved projector, more particularly to an improved wireless audio output assembly for projectors not only having the original integrated multimedia audio and video functions, but also providing an additional wireless speaker output module card for the flexibility of expansions and upgrades, so that consumers can configure the wireless audio output assembly according to their preference.

2. Description of the Related Art

In general, the projectors of the early stage were high priced and large in size, and thus were not quite acceptable for household uses. After the efforts and researches and developments were conducted by manufacturers, the appearance and stylish design of a projector have reduced its size, and the price has dropped to an acceptable level. Therefore, the projector for home theaters has become one of the basic equipments for users' leisure-time activities.

Even in the most advanced design, a projector only has the basic audio output functions, and it is necessary to connect the project with an external optical disk drive, a television receiver or a computer for its use. In other words, if a user wants to view images in a video conference or from an audio/video media, the user requires additional wires or cables to connect the projector with the video conference or audio/video devices. On the other hand, if the image on a computer is outputted through the projector, it is necessary to connect a cable between the projector and the computer. Furthermore, the video data in a memory card of a digital camera cannot be read or outputted through the projector directly. Users have to read the data from the computer first, and then switch the output to the projector before users can view the photos and video data in the memory card. Such application also requires additional cables to connect the related audio output equipments, and the complicated cable connection will cause inconvenience to users, particularly to those who are elderly, young or inexperienced. Furthermore, there are too many cables to be connected to peripherals, not only resulting in a bad looking, but also requiring many remote controls for their use. These are the major shortcomings of the prior-art projectors.

In view of the foregoing shortcomings, the inventor of the present invention has disclosed an improved product that integrated the projector assembly as shown in FIG. 1, which comprises: a system unit, having a projector circuit therein; a projector lens, being disposed on the exterior of the system unit; a card reader, being installed directly in the system unit for reading data from a memory card; a video interface, being installed directly in the system unit for receiving video data; and a video player, being built into the system unit for reading video data from an optical disk; such that the projector can be used as a standalone device to read data from the memory card, view video images and read video data from an optical disk without using additional cables for the connection. The humanistic design and convenience of such product gain good reputation and high evaluation from users.

Although the aforementioned structural design has integrated different audio and video devices to provide the function of directly connecting a memory card, yet the wireless audio output of the product is fixed and cannot be changed flexibly. Therefore, such design cannot satisfy the expandability for the fast changing formats and cannot provide the configurations selected according to the user's preference. Further, this product does not support the design of a microphone, and thus the practical function of this product demands further improvements.

SUMMARY OF THE INVENTION

In view of the description above, the inventor of the present invention based on the spirit of trying for the best and conducted extensive researches and experiments, and finally invented an improved wireless audio output assembly for projectors in accordance with the present invention.

Therefore, it is a primary objective of the present invention to provide an improved wireless audio output assembly for projectors, not only having the original integrated multimedia audio and video functions, but also providing an additional card-type wireless speaker output module for the flexibility of expansions and upgrades, so that consumers can configure the improved wireless audio output assembly according to their preference.

Another objective of the present invention is to add a microphone receiving circuit to the projector assembly, such that the functions of the product are enhanced to satisfy the practical requirements of the projectors.

To achieve the foregoing objectives, an improved wireless video output assembly for projectors in accordance with the present invention comprises a system unit having a projector circuit therein and a projector lens disposed on the exterior of the system unit, and the system unit has a card-type wireless audio output circuit installed therein and a wireless active speaker installed on the exterior of the system unit, so that the projector can be used as a standalone device without being connected by external cables to read data from a memory card, view video images, and read audio/video signals of an optical disk. The projector can be upgraded to the desired wireless audio output circuit by inserting various different cards for the expansion.

The above objects, features and advantages of the present invention will become apparent from the following detailed description taken with the accompanying drawing. However, these drawings are provided for reference and illustration and not intended to act as a limitation to the present invention.

DETAILED DESCRIPTION OF THE PREFERRED EMBODIMENTS

Figure 1:
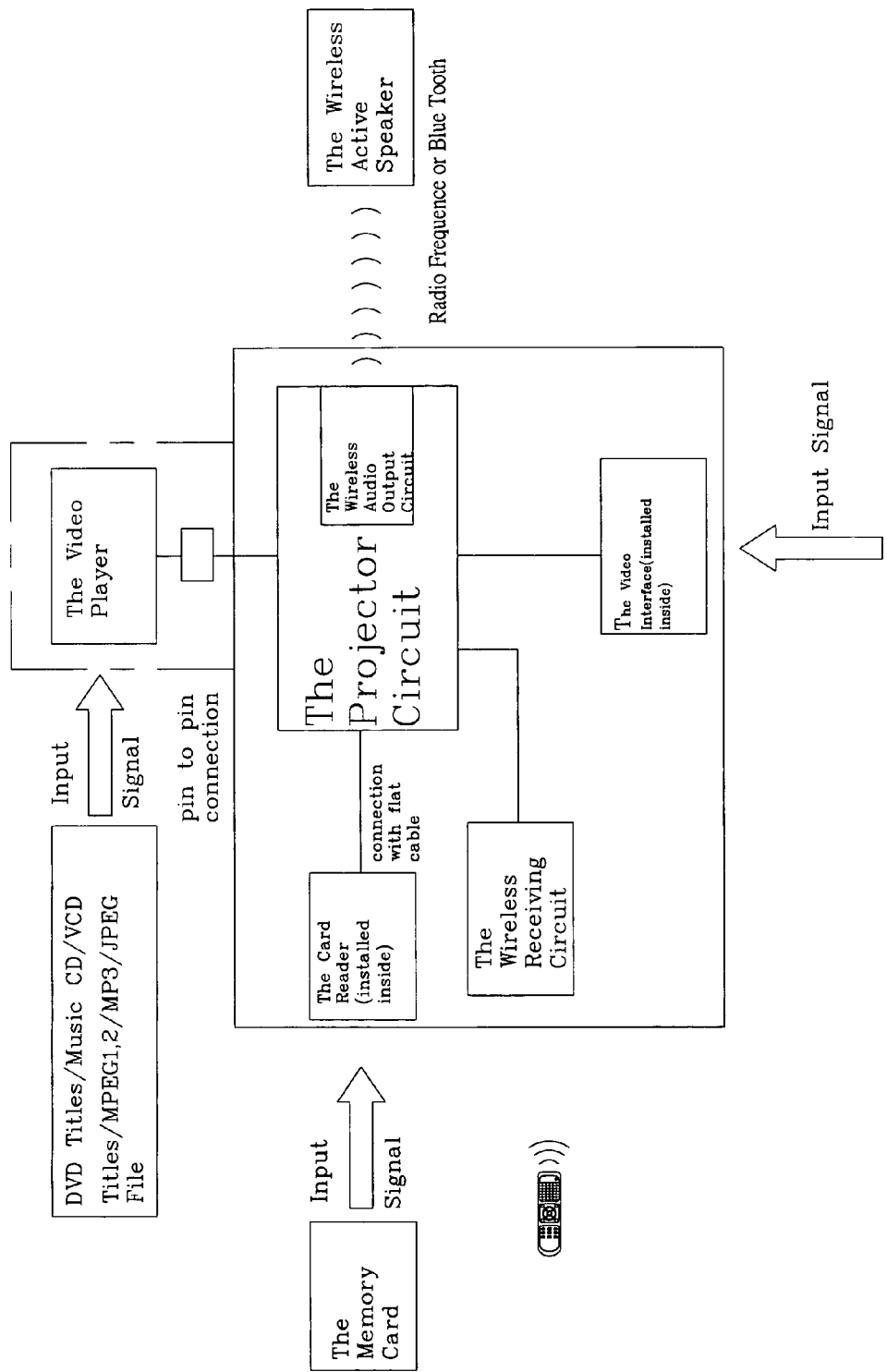
FIG. 1 is a block diagram of the traditional wireless video output assembly for prior-art projectors.

The above and other objects, features and advantages of the present invention will become apparent from the following detailed description taken with the accompanying drawing.

Please refer to FIGS. 2 to 6 for the improved wireless audio output assembly for projectors, which comprises a system unit 1, having a projector circuit 11 therein and a projector lens 12 disposed on the exterior of the system unit 1, and the system unit 1 has a card-type wireless audio output circuit 13 installed therein and a wireless active speaker 5 installed on the exterior of the system unit 1; since the assembly adopts a expansion card type wireless video output circuit 13, therefore the assembly can be set to 2.1 channel or 5.1 channel individually or even upgraded to various advanced input functions by inserting the respective expansion cards. In other words, the projector can be manufactured to have the expanded functions and upgraded to the user's desired wireless audio output circuit 13 by inserting various different expansion cards and allow users to enjoy a higher sound quality.

Figure 2:
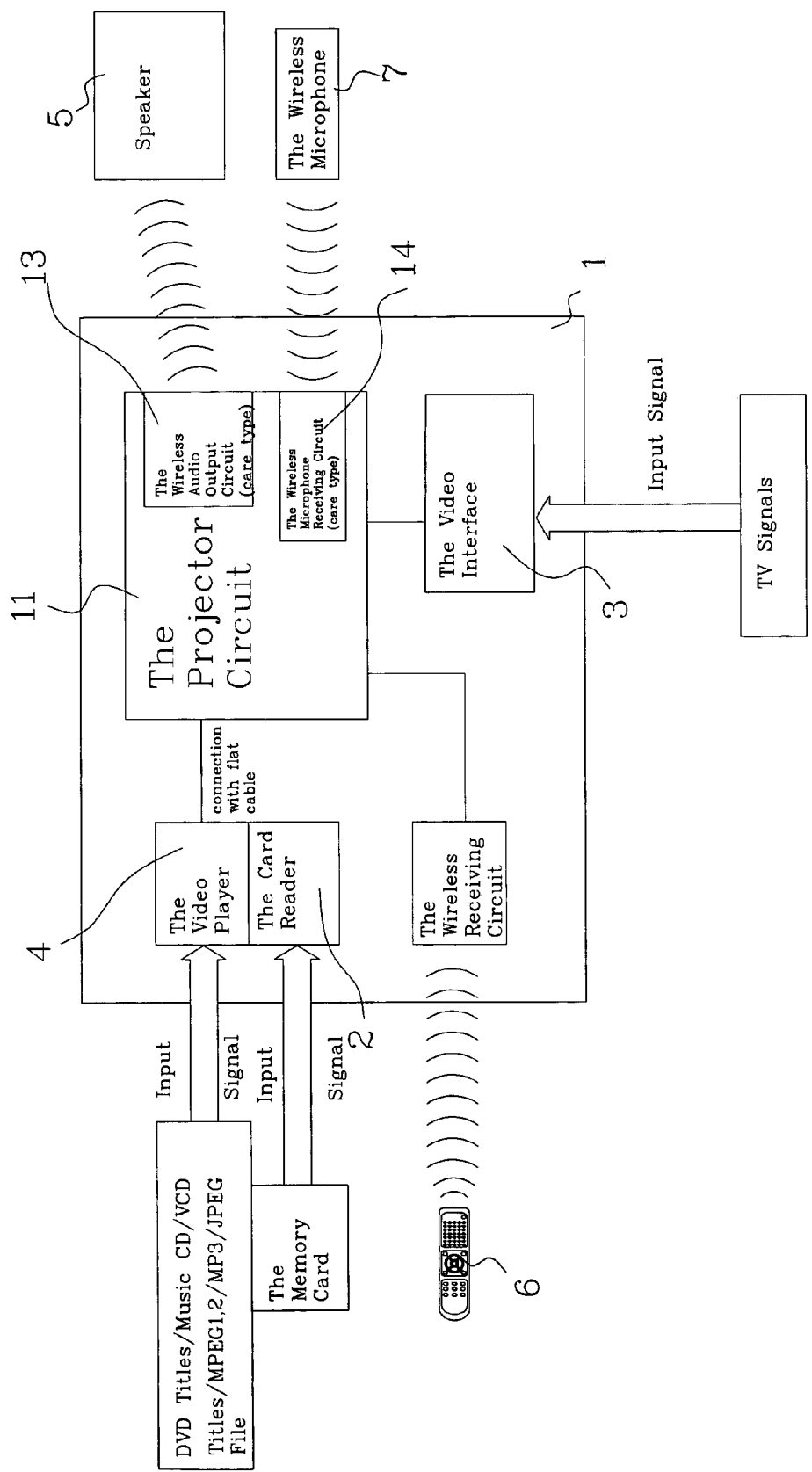
FIG. 2 is a block diagram of the improved wireless video output assembly for projectors according to the present invention.
Figure 3:
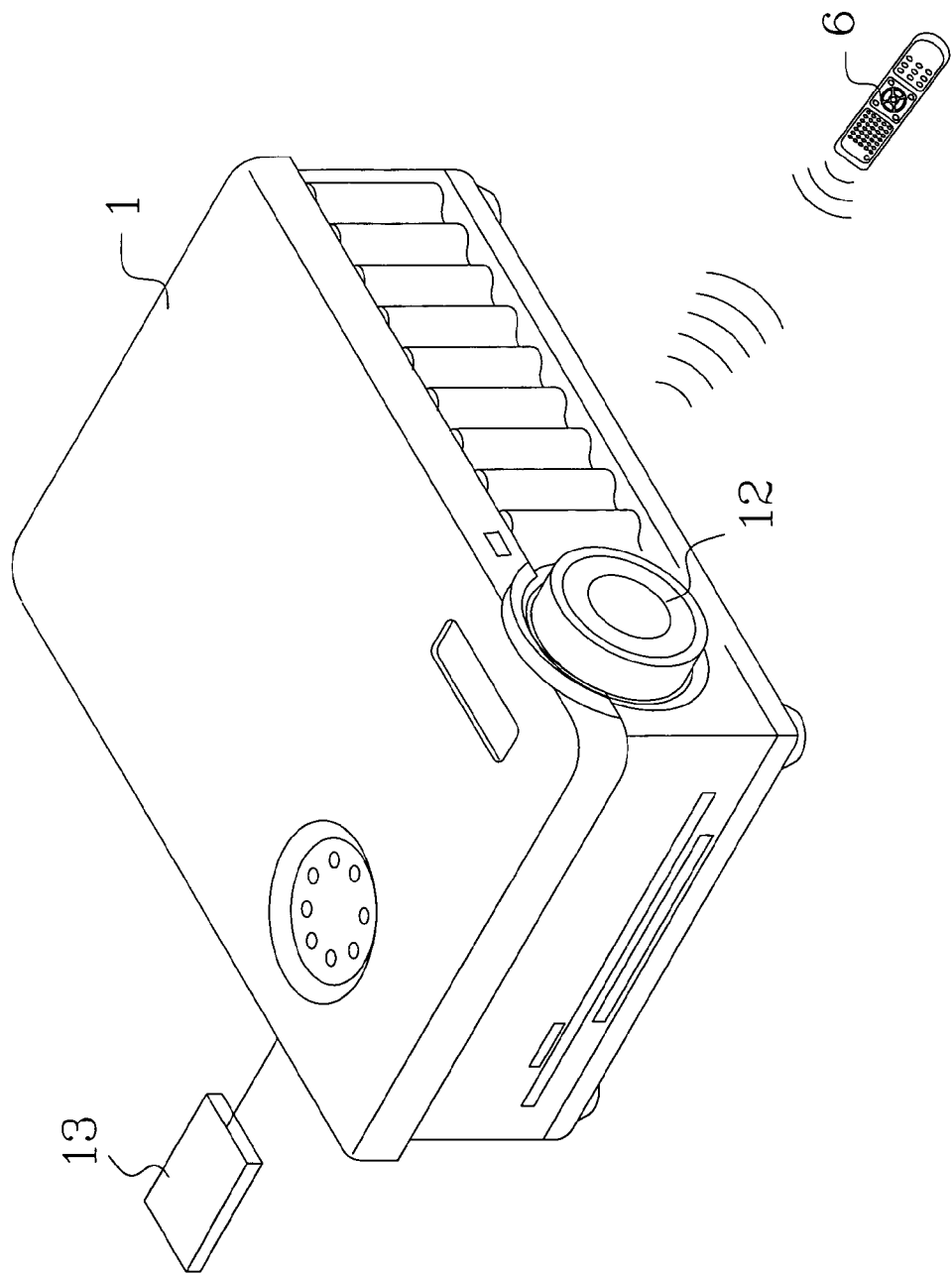
FIG. 3 is a perspective view of the improved wireless video output assembly for projectors according to the present invention.
Figure 4:
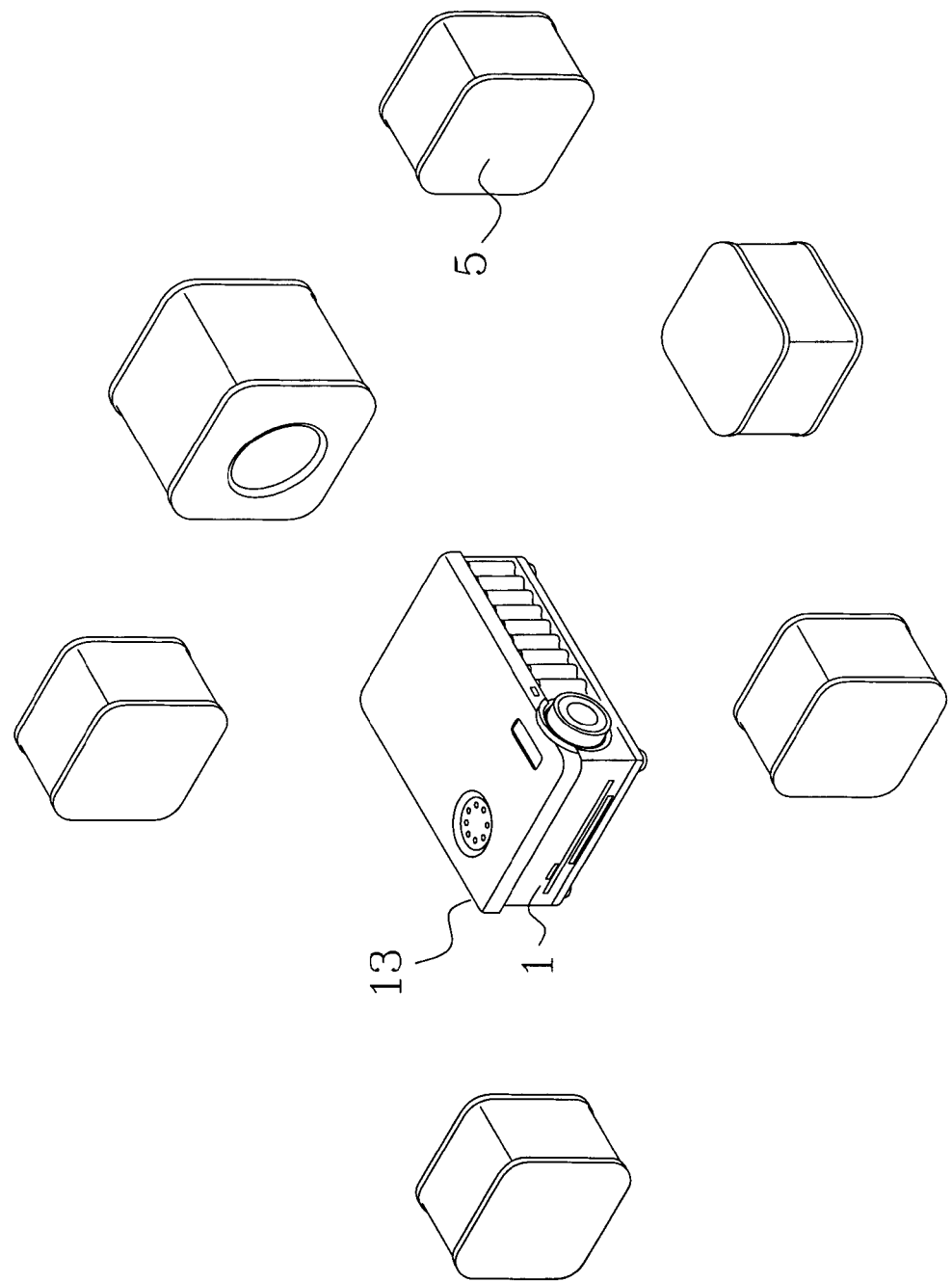
FIG. 4 is a perspective view of the improved wireless video output assembly for projectors including the 5.1 channel wireless speakers according to the present invention.
Figure 5:
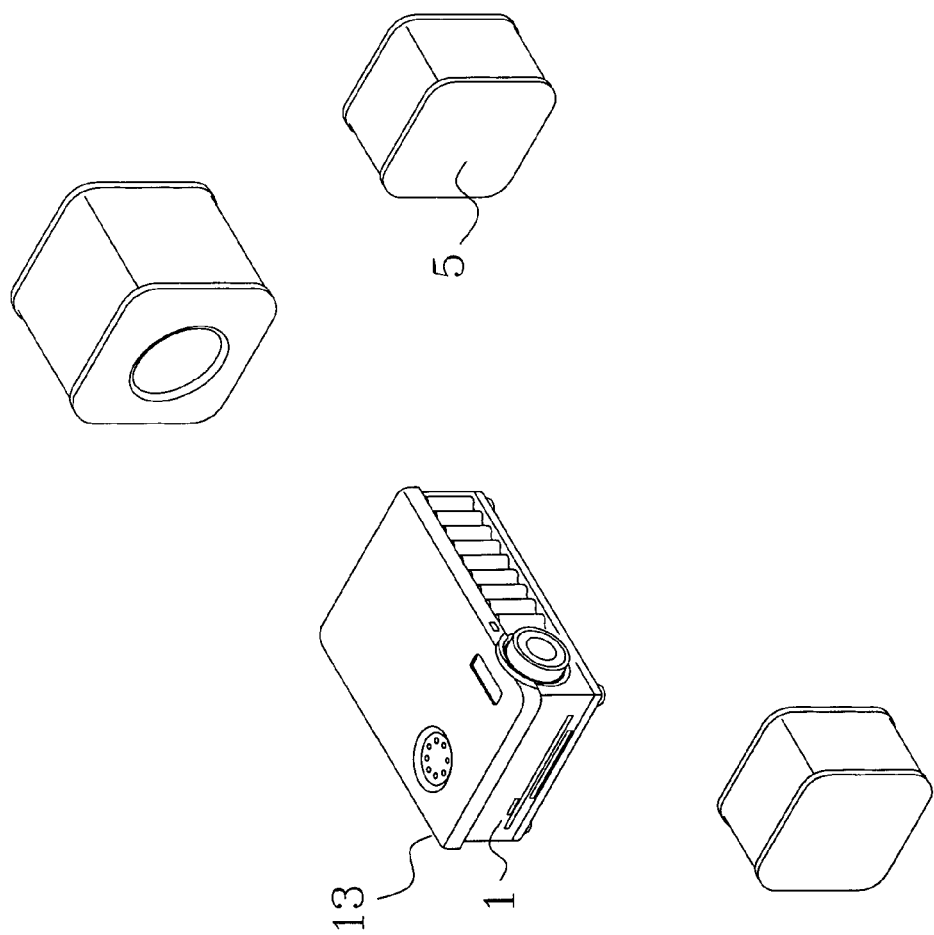
FIG. 5 is a perspective view of the improved wireless video output assembly for projectors including the 2.1 channel wireless speakers according to the present invention.

Please refer to FIG. 2 for a preferred embodiment of the present invention. In FIG. 2, the projector assembly comprises a system unit 1, a card reader 2, a video interface 3 and a video player 4; wherein the system unit 1 having a projector circuit 11 installed therein and a projector lens 12 installed at the exterior of the system unit 1; the card reader 2, being installed directly in the system unit 1 for reading data from a memory card; the video interface 3, being installed directly in the system unit 1 for receiving video signals directly by the system unit; and the video player 4, being a DVD player built in the system unit 1 for reading video data from an optical disk. The card-type wireless audio output circuit 13 could adopt a wireless transmission by a radio frequency technology, a Bluetooth technology or a wireless local area network technology, and its signal source is connected directly to the original digital signal of the video player 4 built into the system unit 1 to save the quantity of components and reduce any distortion caused by signals going through a plurality of digital to analogy conversions. With these components, an independent remote control 6 can be used externally to control the integrated functions of the whole set of system unit 1, card reader 2, video interface 3, video player 4, and wireless speaker 5 by a wireless control.

Figure 6:
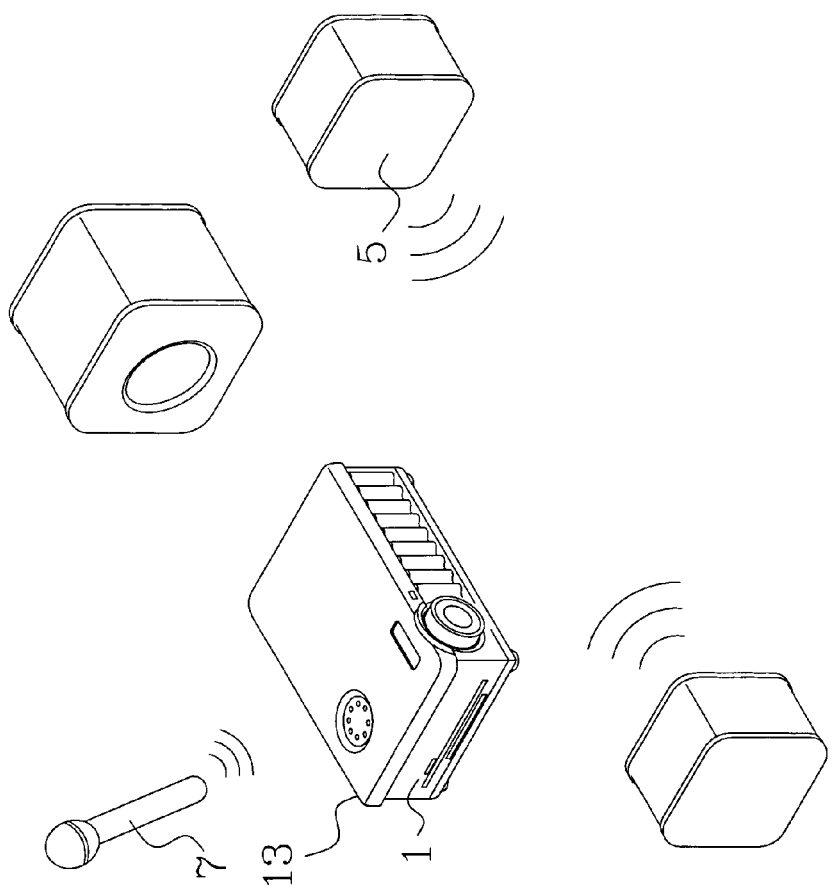
FIG. 6 is an illustrative view of the application of the additional installed wireless microphone according to the present invention.

Please refer to FIGS. 2 and 6. A wireless microphone receiving circuit 14 can be built in the system unit 1, such that the signals from a wireless microphone 7 can be received directly during its use to improve the sound effects for either singing and entertainment or conducting a presentation. Furthermore, the wireless active speaker 5 has a built-in ID auto detect alignment and a plurality of channels to be switched and selected for better transmitting and receiving effects.

In summation of the description above, the present invention definitely can overcome the shortcomings of the prior-art assembly and applications, and enhances the performance than the conventional structure and further complies with the patent application requirements and is submitted to the Patent and Trademark Office for review and granting of the commensurate patent rights.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless audio output assembly for projectors comprising:
    a) a system unit having:
        i) a projector circuit having a card-type wireless audio output circuit and an expansion card removably inserted into the card-type wireless audio output circuit and providing a preselected upgrade for the wireless audio output circuit;
        ii) a projector lens installed on an exterior of the system unit; and
        iii) a wireless microphone receiving circuit;
    b) a card reader;
    c) a video player, the card reader and the video player are installed in the system unit and are electrically connected to the projector circuit;
    d) a wireless microphone, the wireless microphone receiving circuit receiving signals from the wireless microphone; and
    e) at least one wireless active speaker receiving signals from the wireless audio output circuit.

2. The wireless audio output assembly according to claim 1, further comprising a wireless receiving circuit and a remote control, the wireless receiving circuit is located in the system unit and electrically connected to the projector circuit and receiving signals from the remote control.

3. The wireless audio output assembly according to claim 1, wherein the card-type wireless audio output circuit is a 2.1 channel driving module.

4. The wireless audio output assembly according to claim 1, wherein the card-type wireless audio output circuit is a 5.1 channel driving module.

5. The wireless audio output assembly according to claim 1, wherein the card-type wireless audio output circuit is selected from a group consisting of a radio frequency wireless transmission module, a Bluetooth wireless transmission module, and a wireless LAN wireless transmission module.

6. The wireless audio output assembly according to claim 1, wherein the at least one wireless active speaker includes a built-in ID auto-detect alignment and a plurality of channels to be switched and selected.

7. The wireless audio output assembly according to claim 1, wherein the card-type wireless audio output circuit has a signal source directly connected to the video player and receiving an original digital signal form the video player.

8. The wireless audio output assembly according to claim 1, wherein system unit includes a video interface.

* * * * *